C. L. Zeidler,
Mortising Machine.
Nº 48,863.    Patented July 18, 1865.
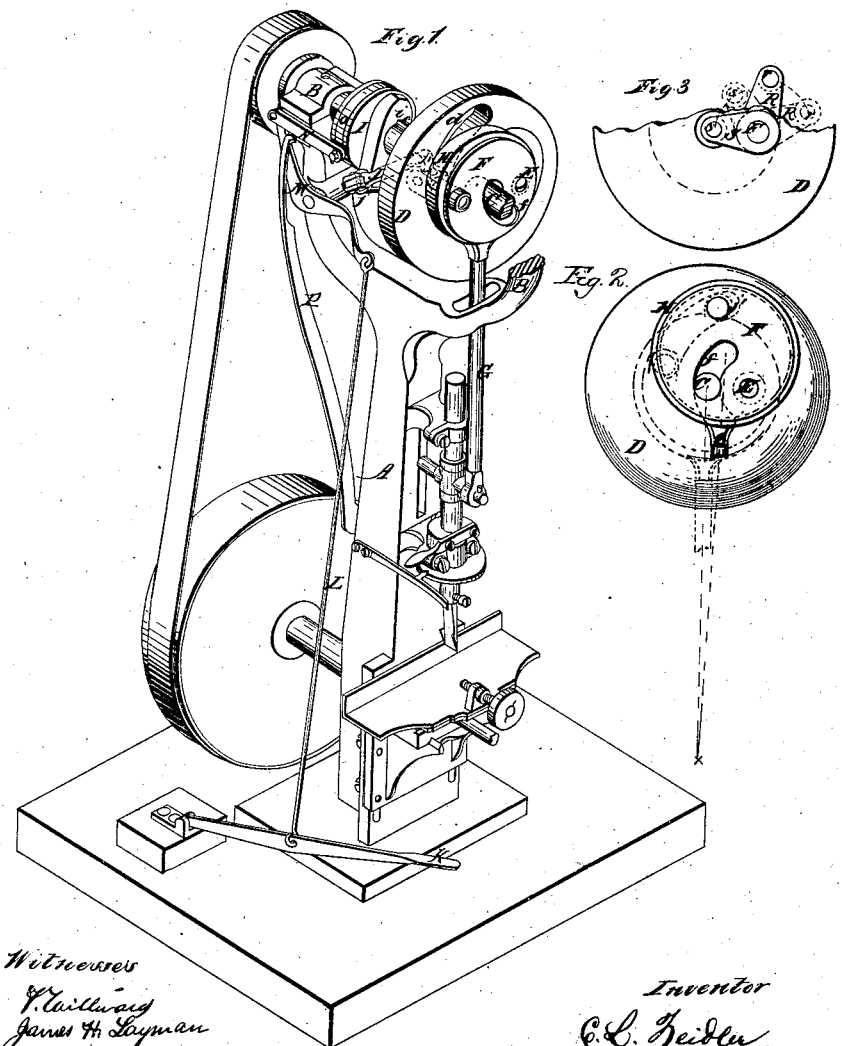

UNITED STATES PATENT OFFICE.

CARL L. ZEIDLER, OF CINCINNATI, OHIO.

IMPROVEMENT IN MORTISING-MACHINES.

Specification forming part of Letters Patent No. 48,863, dated July 18, 1865.

*To all whom it may concern:*

Be it known that I, CARL L. ZEIDLER, of Cincinnati, Hamilton county, Ohio, have invented a new and useful Improvement in Wood-Mortising Machines; and I do hereby declare the following to be a full, clear, and exact description thereof, reference being had to the accompanying drawings, making part of this specification.

My improvement relates to the class of power-machines for sinking mortises in wood whose chisel-action can be started and increased or diminished in its length of stroke at the will of the operator without disconnection from the motor; and my invention consists in an equably operating and effective device for changing or converting a merely axial rotation of the driving-sheave or wrist to revolution in an orbit of greater or less diameter, according to the length of stroke desired, the said device, in its operation, being free from the violent concussions and surging motions commonly incident to machines of this class.

Figure 1 is a perspective view of a machine embodying my improvement. Fig. 2 is a front elevation of the variable sheave and its accessories. Fig. 3 shows a modification of my invention.

A is a frame, having near its upper part two horizontal bearings (of which the rear one, B, only is shown) for a main shaft, C, having a collar or fly-wheel, D.

F is a variable sheave, connected to the collar D by a pivot-bolt, E, which bolt is located an equal distance from the centers of both the collar and the sheave. The sheave F, in its non-effective position, remains coaxial with the collar D and main shaft C, but is capable of being vibrated upon the bolt E as a center, so as to assume any desired eccentricity with said shaft and collar. A strap, H, and rod G connect the sheave F with the chisel-mandrel.

I is a box, restricted to a sliding motion along the main shaft C by means of a groove, $i$, which fits a feather, $c$, on said shaft. The box I and the sheave F are connected the one to the other by universal joints $j$ and $j'$ at the extremities of a toggle-arm, J. The box I, being slid forward along the main shaft C, acts through the toggle-arm J to push the sheave F out of center with the said shaft, so as to cause a reciprocation of the chisel. This sliding forward of the box I is effected by the operator through the medium of a treadle, K, rod L, bell-crank M, and one or more links, N, pivoted to a strap, O, which embraces the sliding box I.

A spring, P, pressing backward against the bell-crank M, acts to restore the sheave F to its central or inactive position the instant that the operator's foot is withdrawn from the treadle.

Curved slots $d$ and $f$ in the collar and variable sheave, respectively, and concentric with the pivot-bolt E, permit the vibrations of the said sheave to be effected without obstruction from the joint $j'$ and main shaft C.

I have selected to illustrate my invention the form preferred and successfully employed by me; but various modifications may obviously be made without departing from the essential characteristics of the improvement. For example, the portion of the main shaft over which the box I slides may be square or of other polygonal or irregular form, the aperture of the box being, of course, a corresponding section. The said box may be retracted by a weight in place of spring P. A hand-lever may be used in place of or in addition to the treadle K, while still another modification may be employed, as follows:

R, Fig. 3, is a crank attached to the rear end of the pivot-bolt E, the crank-pin $r$ being connected to the sliding box in a similar manner to the connection of the sheave therewith in Fig. 1. The front end of the pivot-bolt E may have either a crank and wrist, S $s$, or a sheave, as in Figs. 1 and 2.

I do not claim throwing a mortising-chisel in and out of action by means of a treadle, as I am aware that is done by mechanism different from mine in the mortising-machine of Joseph Guild, patented November 30, 1852.

I claim herein as new and of my invention—

1. The sheave or wrist F, pivoted eccentrically upon its driving-shaft and employed to give motion to a mortising-chisel or analogous tool at the will of the operator.

2. The toggle-arm J and sliding box I, in combination with a treadle-lever or its equivalent, and with an eccentric sheave or wrist, for throwing the tool into and out of action, substantially as set forth.

In testimony of which invention I hereunto set my hand.

CARL L. ZEIDLER.

Witnesses:
GEO. H. KNIGHT,
JAMES H. LAYMAN,